No. 661,733. Patented Nov. 13, 1900.
T. F. DRAKE.
FARRIER'S IMPLEMENT.
(Application filed Mar. 24, 1900.)
(No Model.)
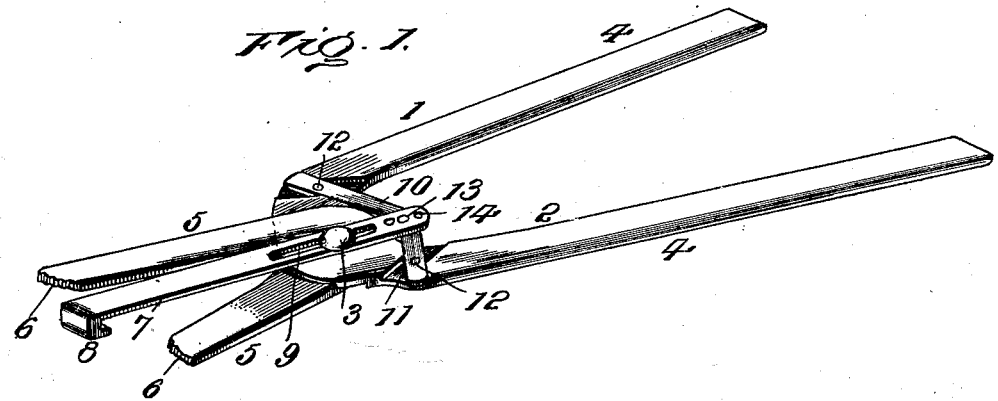
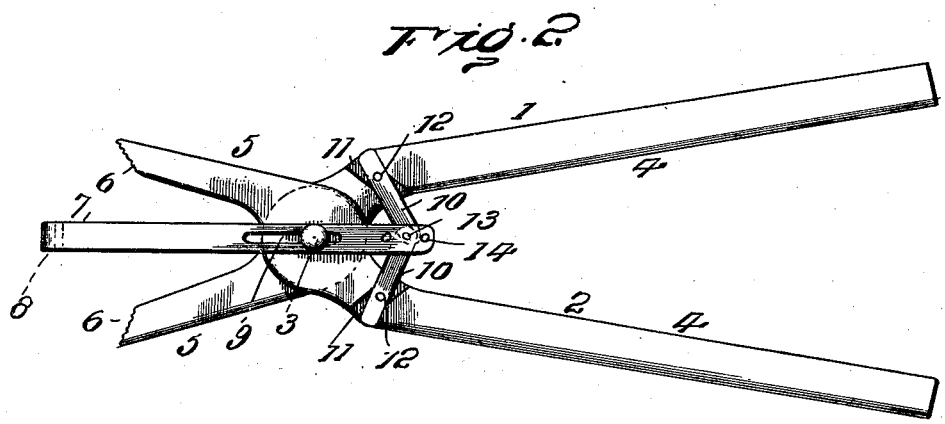
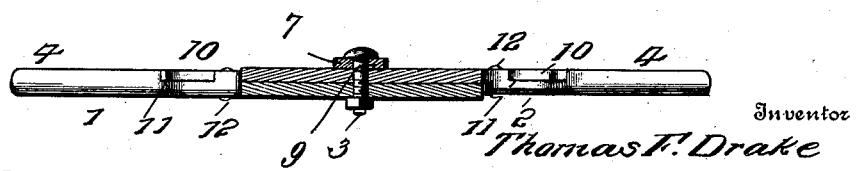
Witnesses
Inventor
Thomas F. Drake
By R. S. & A. B. Lacey Attorney

UNITED STATES PATENT OFFICE.

THOMAS F. DRAKE, OF ROHRSBURG, PENNSYLVANIA.

FARRIER'S IMPLEMENT.

SPECIFICATION forming part of Letters Patent No. 661,733, dated November 13, 1900.

Application filed March 24, 1900. Serial No. 10,053. (No model.)

*To all whom it may concern:*

Be it known that I, THOMAS F. DRAKE, a citizen of the United States, residing at Rohrsburg, in the county of Columbia and State of Pennsylvania, have invented certain new and useful Improvements in Farriers' Implements; and I do hereby declare the following to be a full, clear, and exact description of the invention, such as will enable others skilled in the art to which it appertains to make and use the same.

One purpose of the present invention is the provision of a tool or implement for holding a horseshoe when applying a calk thereto or removing a calk therefrom, thereby preventing injury to the animal, which frequently occurs by reason of the ankle being twisted, especially when considerable force is required either to loosen or to give the final turn to the calk.

A further purpose of the invention is to provide a tool of the character aforesaid which will enable the average person accustomed to handling horses to remove and apply the calks to the shoes as required and without injury or detriment to the animal, the tool involving a simple construction and being easy of manipulation.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1 is a perspective view of a tool particularly designed for attaining the objects of this invention. Fig. 2 is a top plan view thereof. Fig. 3 is a transverse section.

Corresponding and like parts are referred to in the following description and indicated in all the views of the drawings by the same reference characters.

The body of the tool in general appearance resembles a pair of smith's tongs and is composed of levers 1 and 2, pivoted together at 3 and crossing, said levers being widened at their point of crossing and halved, so as to lie about in the same plane. The long arms of the levers constitute handles 4, and the short arms form jaws 5, and their extremities are made rounding and toothed, as shown at 6, so as to engage with the edge of the horseshoe and prevent slipping.

A sliding member 7 coöperates with the pivoted levers and terminates in a jaw 8 of hook form and disposed for coöperation with the jaws 5. The sliding member 7 is of bar form and is longitudinally slotted at 9 to receive the projecting end of the pivot 3, which latter constitutes a guide for the member 7, so as to direct it in its reciprocating movements and insure it occupying a central position with reference to the jaws 5 under all conditions and adjustments. Toggle-levers 10 connect the inner end of the sliding member 7 with the members 1 and 2, the outer ends of the toggle-levers being seated in recesses 11, formed in corresponding sides of the levers adjacent to the pivot-fastening 3, said recesses flaring in opposite directions from an intermediate point, so as to admit of the toggle-levers having ample play. The toggle-levers are pivoted to the handles 4 at a point between their ends and centrally of the recesses 11, as shown at 12, and the same pivot-fastening 13, connecting the inner end of the toggle-levers, also forms securing means for the sliding member 7. The recesses 11 are constructed so as to prevent the toggle-levers 10 stopping on a dead-center. Hence the handles 4 can at all times be separated or brought together to cause the jaws 5 and 8 to grip the horseshoe when required. It may sometimes be of advantage to have the sliding member 7 adjustably connected with the toggle-levers, and for this purpose the inner end thereof is provided with a series of openings 14 to receive an end portion of the pivot-fastening 13.

When it is required to either remove or apply a calk to a horseshoe secured to the animal's foot, the shoe is gripped between the jaws 5 and 8 and the outer ends of the handles 4 are firmly grasped, thereby preventing lateral movement of the shoe or foot. A wrench is applied and fitted to the calk and the latter loosened or tightened, as desired, the foot of the horse being prevented from twisting by holding the tool firm, as will be readily understood. By having the jaw 8 of hook form it engages over the edge of the shoe and prevents slipping of the tool, the toothed ends 6 engaging with the opposite edge of the shoe and preventing possible slipping of the tool when in operation.

Having thus described the invention, what is claimed as new is—

1. A farrier's implement for the purposes stated, comprising pivoted levers having their extremities constructed to engage with an edge of a horseshoe, a sliding member arranged to maintain a central position with reference to the levers at all movements thereof and provided with a jaw to coöperate with the aforesaid terminals of the levers, and toggle-levers connecting the sliding member with the pivoted levers, substantially as set forth.

2. A farrier's implement for the purposes described, comprising pivoted levers having corresponding sides adjacent to the pivot recessed, a sliding member normally maintaining a central position with reference to the levers and provided with a jaw to coöperate therewith, and toggle-levers seated in the recesses of the pivoted levers and connecting the latter with the sliding member, substantially as set forth.

3. A farrier's implement comprising pivoted levers provided with jaws, a slidable member having a jaw and directed in its sliding movements by an extension of the pivoted fastening of the levers, and toggle-levers connecting the pivoted levers with the sliding member, substantially as set forth.

4. The herein-described farrier's implement for the purposes stated, comprising levers pivoted together and crossing forming-jaws and handles, the jaws having their extremities curved and toothed and the handles having corresponding sides recessed, a sliding member mounted upon an extension of the pivot-fastening of the levers and terminating in a hooked jaw to coöperate with the toothed ends of the pivoted levers, and toggle-levers connecting the pivoted levers with the sliding member and seated in the recesses of the handles, substantially as described.

In testimony whereof I affix my signature in presence of two witnesses.

THOMAS F. DRAKE. [L. S.]

Witnesses:
D. R. COFFMAN,
MILES M. BETZ.